(12) United States Patent
Lehmann

(10) Patent No.: US 9,089,753 B2
(45) Date of Patent: Jul. 28, 2015

(54) TRANSPONDER EQUIPPED, LIGHT EQUIPPED AND SOUND EMITTING LOCATABLE DISK FOR USE IN THE GROWING SPORT OF DISK GOLF WITH CENTRIFUGAL SWITCH ACTIVATION

(75) Inventor: Harry V. Lehmann, Novato, CA (US)

(73) Assignee: Green Swan, Inc., Novato, CA (US)

( * ) Notice: Subject to any disclaimer, the term of this patent is extended or adjusted under 35 U.S.C. 154(b) by 104 days.

(21) Appl. No.: 13/595,892

(22) Filed: Aug. 27, 2012

(65) Prior Publication Data

US 2013/0225338 A1    Aug. 29, 2013

Related U.S. Application Data

(60) Provisional application No. 61/527,920, filed on Aug. 26, 2011.

(51) Int. Cl.
*A63F 13/10* (2006.01)
*A63B 65/10* (2006.01)
*G01S 1/70* (2006.01)

(52) U.S. Cl.
CPC .. *A63B 65/10* (2013.01); *G01S 1/70* (2013.01)

(58) Field of Classification Search
USPC ................................................ 463/3; 473/570
See application file for complete search history.

(56) References Cited

U.S. PATENT DOCUMENTS

| 5,634,855 | A | * | 6/1997 | King | 473/221 |
| 7,205,894 | B1 | * | 4/2007 | Savage | 340/568.6 |
| 8,152,657 | B2 | * | 4/2012 | Green | 473/386 |
| 8,336,147 | B2 | * | 12/2012 | Knez | 15/21.2 |
| 8,657,351 | B2 | * | 2/2014 | Johnson | 294/19.2 |

* cited by examiner

*Primary Examiner* — Pierre E Elisca
(74) *Attorney, Agent, or Firm* — Duane Morris LLP

(57) ABSTRACT

A method and system for locating an object in which the activation of the alert is predicated on the recent relative movement of the object. As a result, the alert is only activated after an event in which the object might be lost. In addition, a receiver integrated in the object is similarly only activated after a relative movement for a predetermined period of time associated with a search for the object, if a signal is received during the period, the alert is activated.

19 Claims, 3 Drawing Sheets

TRANSPONDER EQUIPPED, LIGHT EQUIPPED AND SOUND EMITTING LOCATABLE DISK FOR USE IN THE GROWING SPORT OF DISK GOLF WITH CENTRIFUGAL SWITCH ACTIVATION

RELATED APPLICATIONS

This application claims priority benefit of provisional application No. 61/527,920 filed Aug. 26, 2012 entitled "A Transponder Equipped, Light Equipped and Sound Emitting Locatable Disk for Use in the Growing Sport of Disk Gold, With Centrifungal Switch Activation", the entirety of which is hereby incorporated by reference.

BACKGROUND

"Disk Golf" as a sport has grown into a substantial industry. A Google search engine query for Disk Golf this date showed 27,000,000 responses. There is a Professional Disk Golf Association (PDGA), on the Amazon marketplace on the Internet that currently features 1,185 products or sale under the category "Disk Golf."

The basic rules of Disk Golf most closely resemble Golf itself, but baskets, typically chain baskets, are placed upon the courses at the end of the green, and Disk Golf rounds are played at both manicured courses, and unkempt courses in rural settings. There is a tremendous diversity in the quality of Disk Golf courses.

Disk Golf shares the fun and the frustrations of the traditional game of golf. The enjoyment of this recreational process include getting through the course with the minimum obtainable number of throws. There are "out of bounds" areas in Disk Golf, and, just as golf balls will sometimes get lost "in the rough", Disk Golf disks can often be lost, particularly in the more rural and less manicured settings.

While golf balls, such as the Wilson Titanium, can be purchased for less than a dollar per ball ($11.14 for 18 on Amazon), one of the differences between Disk Golf and the traditional game of golf, is that the disks used for Disk Golf are considerably more expensive. For example, while a very inexpensive set of three golf disks can be had for twenty dollars, enthusiasts often will pay as much as fifteen dollars per such disk: For example, the Innova company is a leading manufacturer in this field, and sells its Champion kit of three disks for $44.95 (the disks have different characteristics, similar to the differing characteristics of the clubs in traditional golf).

Just as in traditional golf, Disk Golf enthusiasts will have reports of disks that "never returned," and were lost in the rough. More frequently, the disk is eventually found, after an extended period of searching in weeds and thorns. A purpose of the instant method and device is to provide additional variants to the disk arsenal of the disk golf enthusiast, in the form of disks which are equipped with one or more different variants of equipment for installation to Disk Golf disks, to offer enthusiasts the alternatives of employing modern technology to assist in the location of lost disks.

Many consumer products are currently in the market which assist consumers to find commonly misplaced items. These devices, generically referred to as "item locaters" operate on the basis of a radio transponder. In typical iterations, a short range master radio signal emitter is sold along with several receivers; the receivers are in turn attached to items, such as keys, which the end user has a history of misplacing, so that such items can be readily located, much to the relief of the end user and his or her companions.

In typical iterations, a switch or button is pushed on the sending device, which emits a burst of a short range signal, within one of the bands of frequency allowed for such civilian convenience item use. The battery powered receiving device is typically in a "constant on" condition, though centrifugal activation may be employed as herein described in the interest of battery life prolongation. The slave unit has circuitry such that upon receipt of the signal from the master device, a switch is closed, in turn causing the closure of a circuit which results in a loud sound and/or light to issue. The sound then leads the owner of the sought device to its location.

Numerous existing consumer products use variants of this technology- some, such as the device sold as the "keyringer" are reciprocal identical send/receive units, so that a frequency matched pair, only, is sold to the consumer, with one for "slave" attachment to the often misplaced device (keys, cell phones, etc.) and the other to serve as the "master" broadcast source, to be attached to some other object or station. Examples of such consumer products are sold under names such as "Click 'n Dig", "Orliv Smart Finder", and the "Wireless Key Finder."

The above devices work well for keys, and small modular exemplars are built into cases small enough to be readily installed onto key rings typically with an aperture on the device to accept a small intermediary key ring and then the device to be attached to the main key ring, or other sought object, via that intermediary key ring.

DETAILED DESCRIPTION

Figure 1:
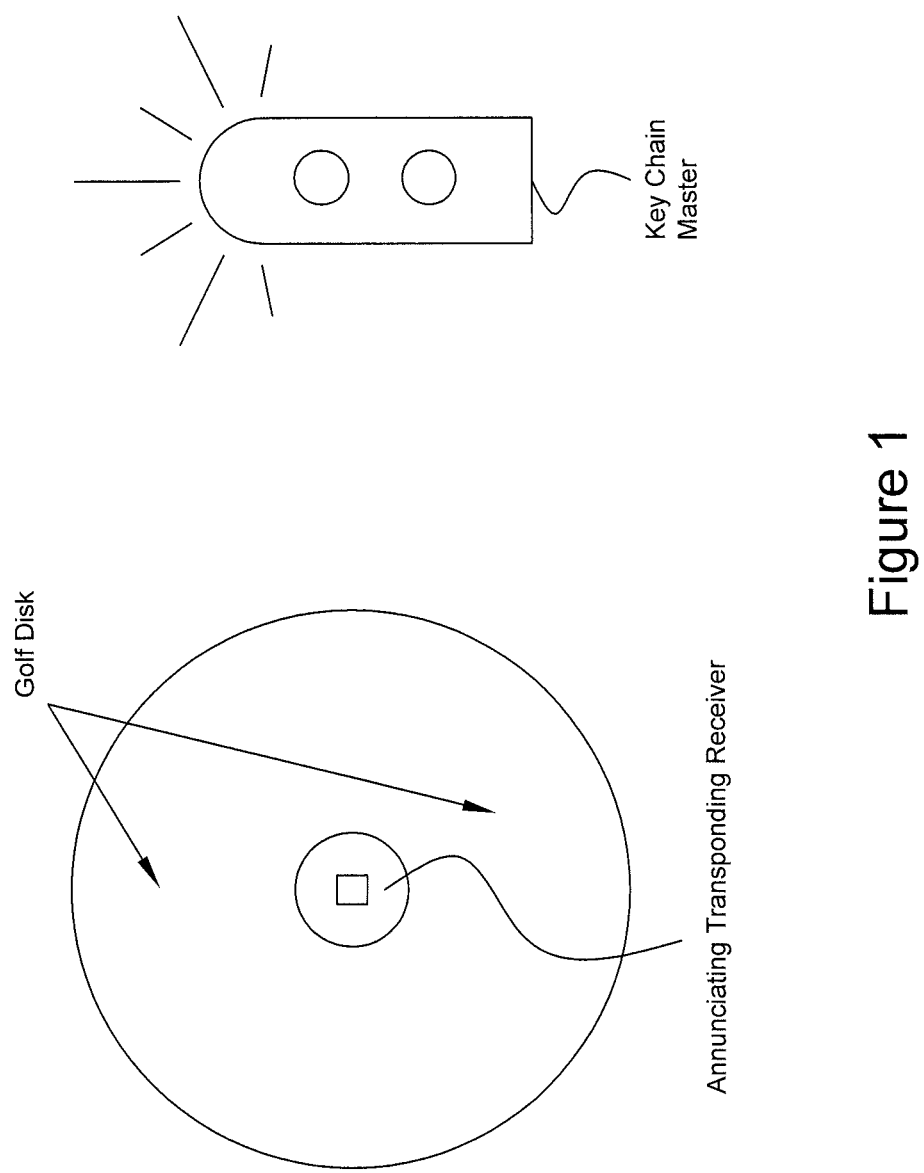
FIG. 1 is an illustration of the Golf Disk and activator

In the System and Method as shown in FIG. 1, a slave radio transponding unit is installed into the center of the GolfDisk. A desired market for this System and Method is for use by Disk Golf enthusiasts, when they are engaged in recreation in less manicured areas, where the possibility of disk loss is increased, though the device is useful at any course for play. Should it occur that a disk is lost in the rough, the system and method here described allows for location of the lost disk. and in any event will dramatically reduce time spent in search. The "master" sending unit is retained by the Disk Golf enthusiast, and in the instance of Disk loss, a button is switched on the sending unit, causing a corresponding "ping" or "beep" to commence at pre-set intervals in the Disk gone astray. The power consumption to allow such units to remain in the "constant on" condition is very low, which is why such units can be used effectively for months at a time without a battery charge.

However, in the interest of battery life prolongation, of particular utility in sealed unit applications, the here Claimed unit can be equipped with a centrifugal switch, such that the spinning of the Disk in launch and flight will result in turning the receiving device to the "on" condition, for a period to be determined by the manufacturer.

Figure 2B:
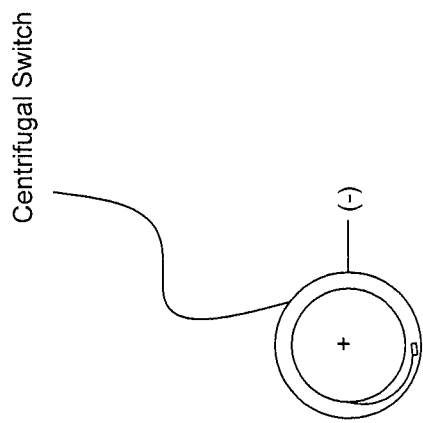
FIG. 2B is an illustration of a centrifugal activated switch
Figure 2A:
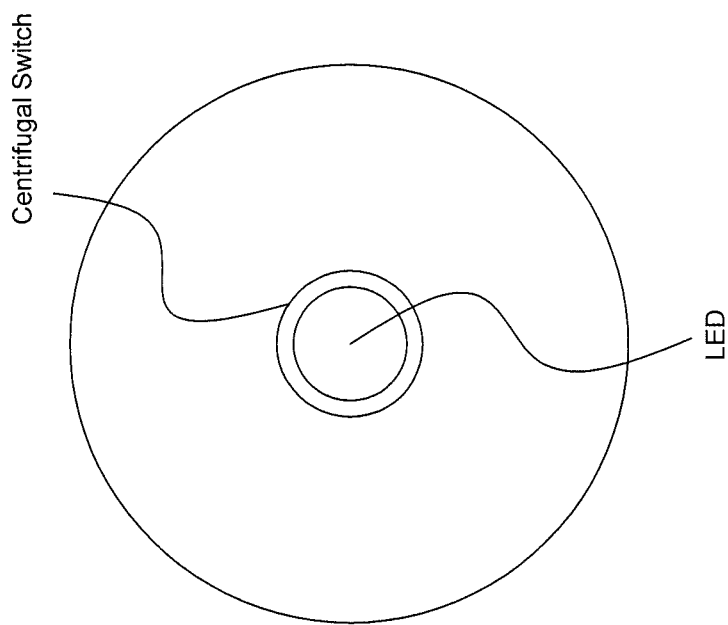
FIG. 2A is an illustration of the Golf Disk with a LED

In one embodiment of the System and Method a L. E. D. light is integrated into the center of the Golf Disk as shown in FIG. 2A, so that the Disk Golfer will have the addition of a blinking light on the disk as an aid to its location. As shown in FIG. 2B the L.E.D. may be actuated by a switch, including a pressure switch situated in the center of the subject disk in order to assure center of gravity symmetry. The LED may also be activated by many other means In another embodiment the integrations of a sound alarm may be used as shown in FIG. 3, or both sound alarm and light alarm may be integrated as a part of the "Locatable Disk"

The centrifugal switch of FIG. 2b allows the activation of both the LED and the transponder. A printed micro-circuitry to set a timed rhythmus for the illumination of the Disk, including allowance for illumination after a programmable passage of time, so that a Disk lost in hard daylight may be easily found in low light conditions, may also be incorporated.

Figure 3:
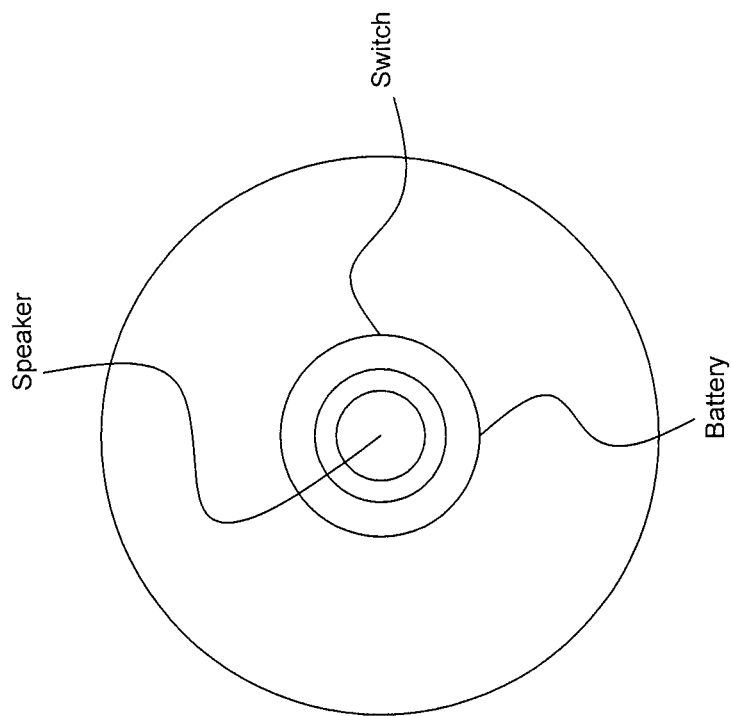
FIG. 3 is an illustration of a Golf Disk with an audio signal

As shown in FIG. 3, an embodiment of the System and Method in which a battery activated sound generation device, including but not limited to a battery powered micro-switch or microchip actuated electric speaker-based sound generator, is included within the center of a Golf Disk, such that a "ping" or "beep" or other sound issues from the disk.

The ping above is actuated with a centrifugal switch, such that the throw and flight of the disk causes the closing of a switch, such that a chip timed sound is emitted from the Golf Disk, so as to facilitate location of same.

Figure 4:
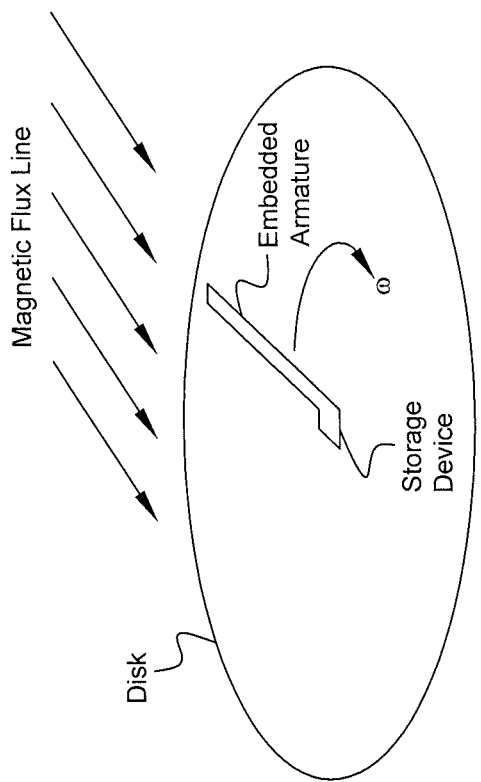
FIG. 4 is an illustration of a rotational charging and activating armature within a Golf Disk.

The LED or acoustic alerts on the Disk may also be advantageous when involved in Night golf, where the absence of light would increase the likelihood of losing the disk or ball. Additionally as shown in FIG. 4, the rotation of the disk in the earth's magnetic field could be used to sufficiently charge an energy storage device such as a capacitor, inductor or battery in the event the alert needed to be activated. Thus reducing the cost, size and weight of the alert device.

Similar location technology of course could be used in any manner of spinning items, such as base balls, soft balls, soccer balls etc. The resultant charge may also be used in lieu of a switch, or act as the switch itself, rather than a mechanical switch.

Aspects of the described subject matter allow the alerts to be triggered by the rotation of the Golf Disk, similarly the receiver may be advantageously activated by the rotation of the Golf disk via a switch, which in turn upon receipt of a signal from the retained transmitter would activate the alert (visual or aural). Likewise, other circuitry may be activated by the relative motion of the Golf disk, which may activate the alert subject to receiving a signal, or subject to a predetermined period of time.

The switch may be of a mechanical, analog, circuitry, microprocessor, piezoelectric or gate. The power source may be a chemical battery, capacitor, piezoelectric, inductor or mechanical storage device.

The invention claimed is:

1. A system for locating an object, comprising:
    a signal emitter;
    a signal receiver configured to receive a signal transmitted by the emitter,
    a switch,
    an alarm;
    wherein said receiver, switch and alarm are integrated in or on said object; and
    wherein said switch is configured to activate the receiver subsequent to relative motion of the object and wherein said signal receiver is configured to activate the alarm on detection of said signal.

2. The system of claim 1, wherein the switch activates the signal receiver for a predetermined period of time.

3. The system of claim 1, wherein the switch is a centrifugal switch, and the relative motion is rotational.

4. The system of claim 1, wherein the switch is an accelerometer and the relative motion is accelerations.

5. The system of claim 1 further comprising a power source integrated in or on said object.

6. The system of claim 5, wherein the power source supplies the signal receiver and the alarm, and wherein the power source is activated by said switch.

7. The system of claim 5, wherein the power source is a battery.

8. The system of claim 5, wherein the power source is a capacitor.

9. The system of claim 5, wherein the power source is charged by the relative motion of the object.

10. The system of claim 1, further comprising a second power source integrated with the signal emitter.

11. The system of claim 1, wherein the signal emitter is remote from the object.

12. The system of claim 1, wherein the object is a ball.

13. The system of claim 1, wherein the object is a disc.

14. The system of claim 1, wherein the receiver, switch and alarm are centered in the object.

15. A method of locating an object, comprising:
    causing the object to undergo relative motion;
    detecting the relative motion;
    activating a receiver associated with the object subsequent the relative motion;
    sending a wireless signal to the receiver from a location remote from the object;
    receiving the wireless signal and activating an alarm in or on the object upon receipt of the wireless signal.

16. The method of claim 15, further comprising activating the receiver for a predetermined period of time subsequent the relative motion.

17. The method of claim 15, wherein the alarm is visual.

18. The method of claim 15, wherein the alarm is aural.

19. The method of claim 15, wherein the step of activating the receiver is via a switch integrated in the object.

* * * * *